(12) United States Patent
Bonser

(10) Patent No.: US 6,719,113 B2
(45) Date of Patent: Apr. 13, 2004

(54) CLUTCH HUB

(75) Inventor: Anthony Bonser, Tamworth (GB)

(73) Assignee: Alcon Components Limited (GB)

( * ) Notice: Subject to any disclaimer, the term of this patent is extended or adjusted under 35 U.S.C. 154(b) by 0 days.

(21) Appl. No.: 10/045,744

(22) Filed: Nov. 7, 2001

(65) Prior Publication Data

US 2002/0108833 A1 Aug. 15, 2002

(30) Foreign Application Priority Data

Nov. 7, 2000 (GB) .............................................. 0027101

(51) Int. Cl.[7] .............................................. F16D 13/68
(52) U.S. Cl. ................ 192/70.2; 192/107 R; 192/109 R
(58) Field of Search ............................. 192/70.2, 70.27, 192/107 R, 109 R

(56) References Cited

U.S. PATENT DOCUMENTS

| 1,855,533 | A | * | 4/1932 | Tower ........................ 192/200 |
| 2,908,368 | A | * | 10/1959 | Granke et al. ........... 192/107 R |
| 3,631,953 | A | * | 1/1972 | Snoy et al. ............... 192/70.17 |
| 5,127,499 | A | * | 7/1992 | Beccaris et al. ......... 192/70.27 |
| 5,181,594 | A | * | 1/1993 | Nash ........................ 192/70.27 |
| 5,638,932 | A | * | 6/1997 | Mizukami ................ 192/70.12 |
| 5,743,367 | A | * | 4/1998 | Hofmann et al. .......... 192/70.2 |
| 6,021,878 | A | | 2/2000 | Kosumi et al. ........... 192/89.23 |
| 6,070,707 | A | * | 6/2000 | Hofmann et al. .......... 192/70.2 |

FOREIGN PATENT DOCUMENTS

| EP | 0 335 600 | 10/1989 |
| EP | 0 797 016 | 9/1997 |
| FR | 2 748 677 | 11/1997 |
| GB | 2 075 617 | 11/1981 |
| GB | 2 256 240 | 12/1992 |
| GB | 2 300 679 | 11/1996 |
| GB | 2 317 208 | 3/1998 |
| JP | 61-45116 A | * | 3/1986 |
| JP | 62-165037 | 7/1987 |

* cited by examiner

Primary Examiner—Richard M. Lorence
(74) Attorney, Agent, or Firm—Woodcock Washburn LLP

(57) ABSTRACT

A hub assembly for a carbon/carbon clutch comprising a hub, a first clutch plate, and retaining means or locator releasably attachable to the first clutch plate thereby axially to define the position of the first clutch plate with respect to the hub.

51 Claims, 14 Drawing Sheets

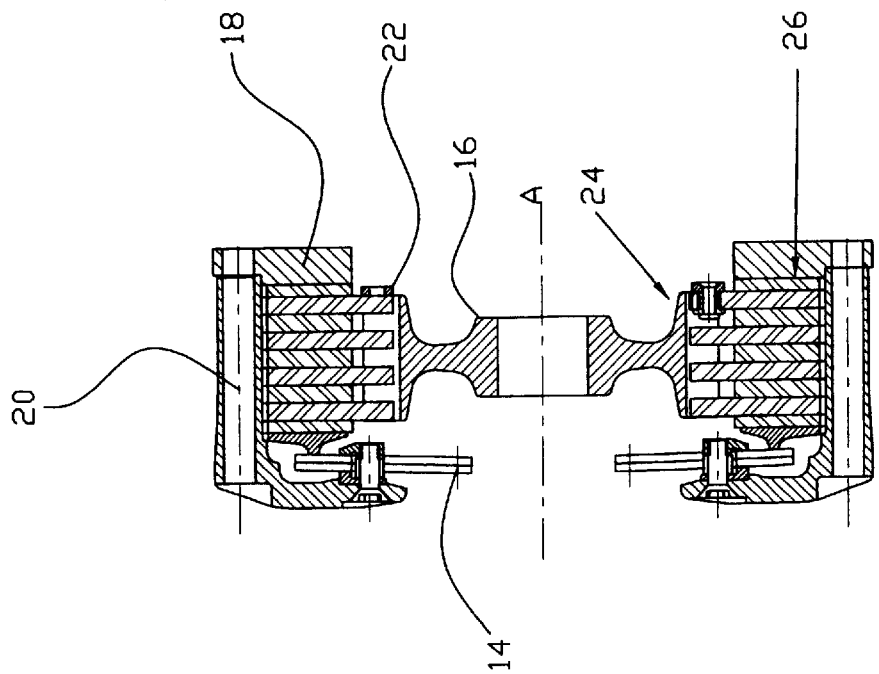
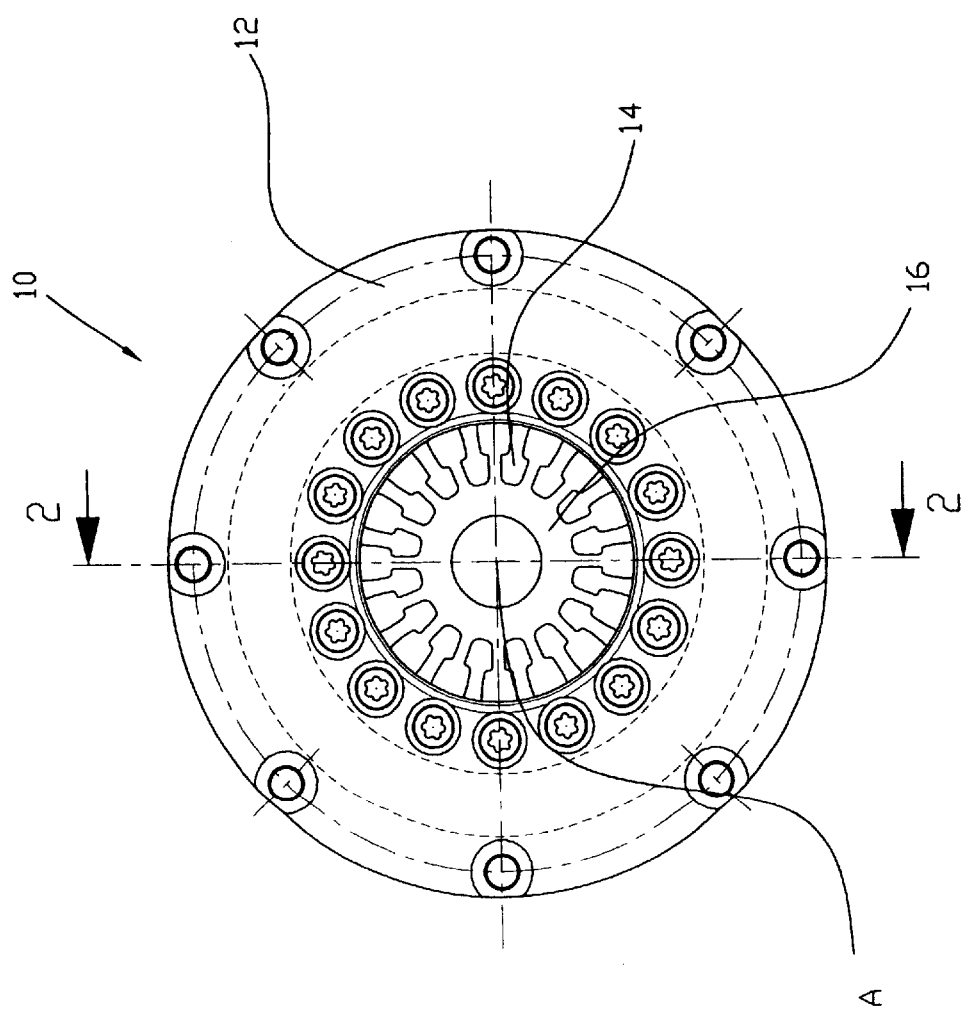

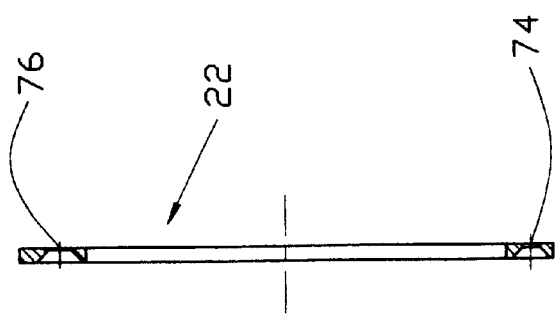
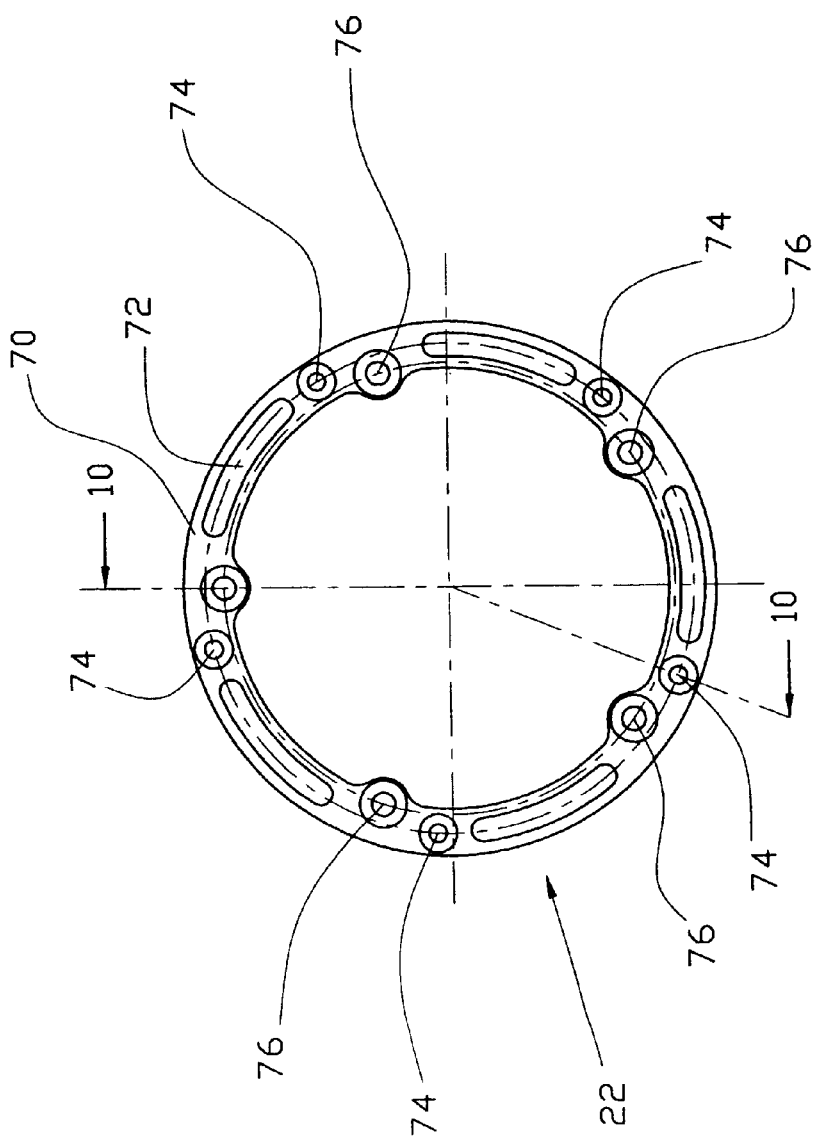
FIG 10
FIG 9

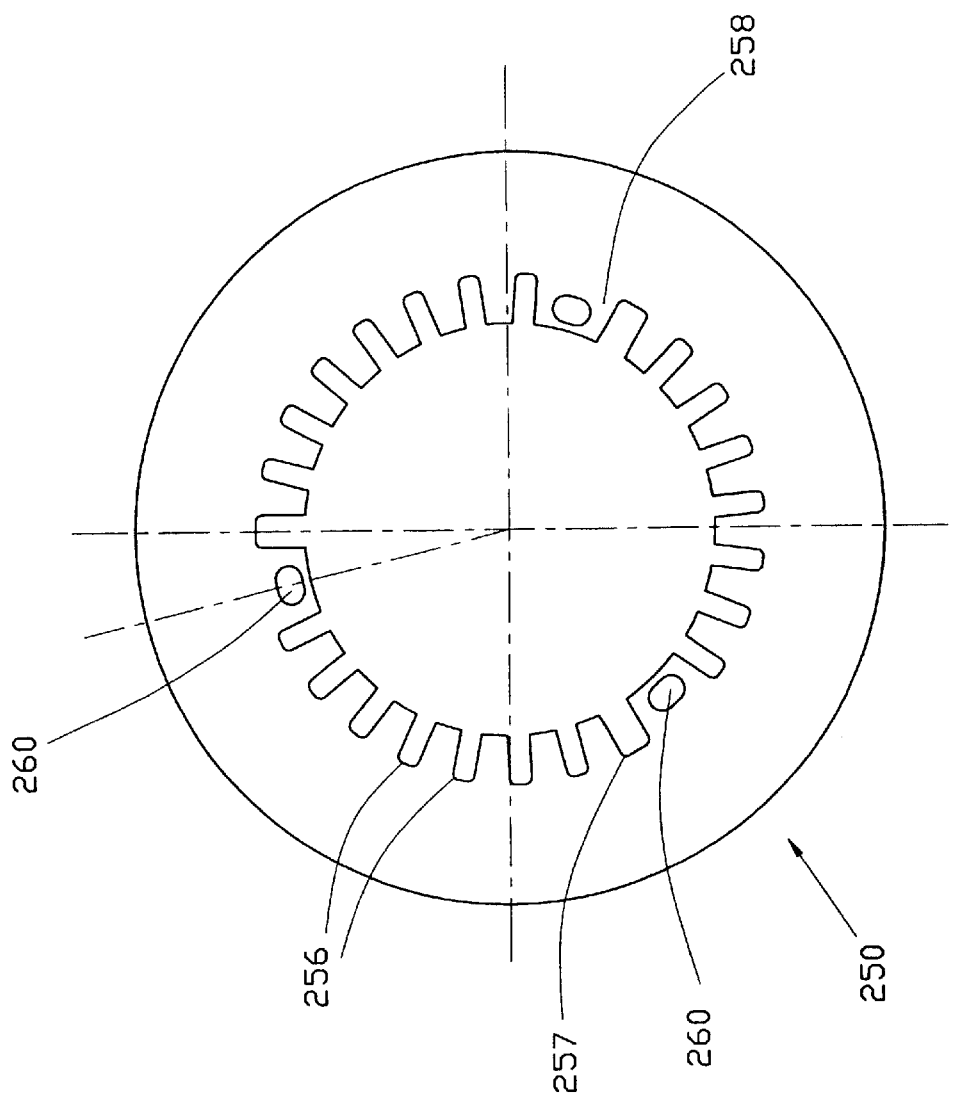
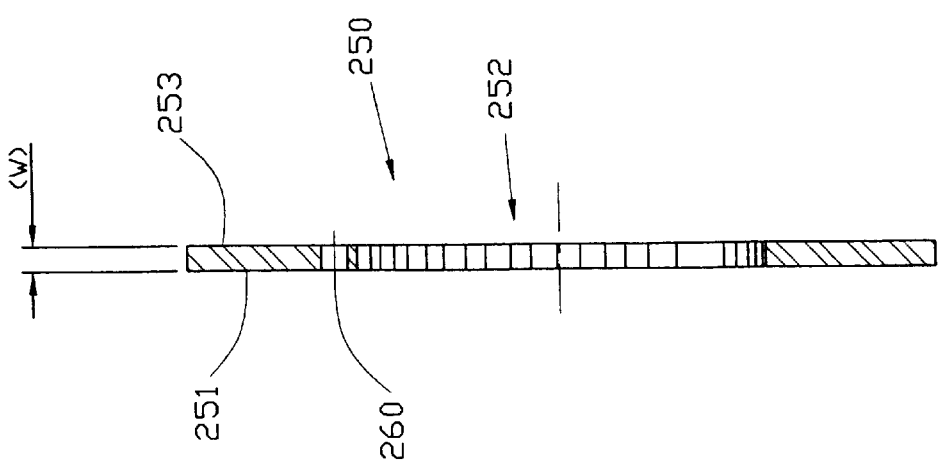

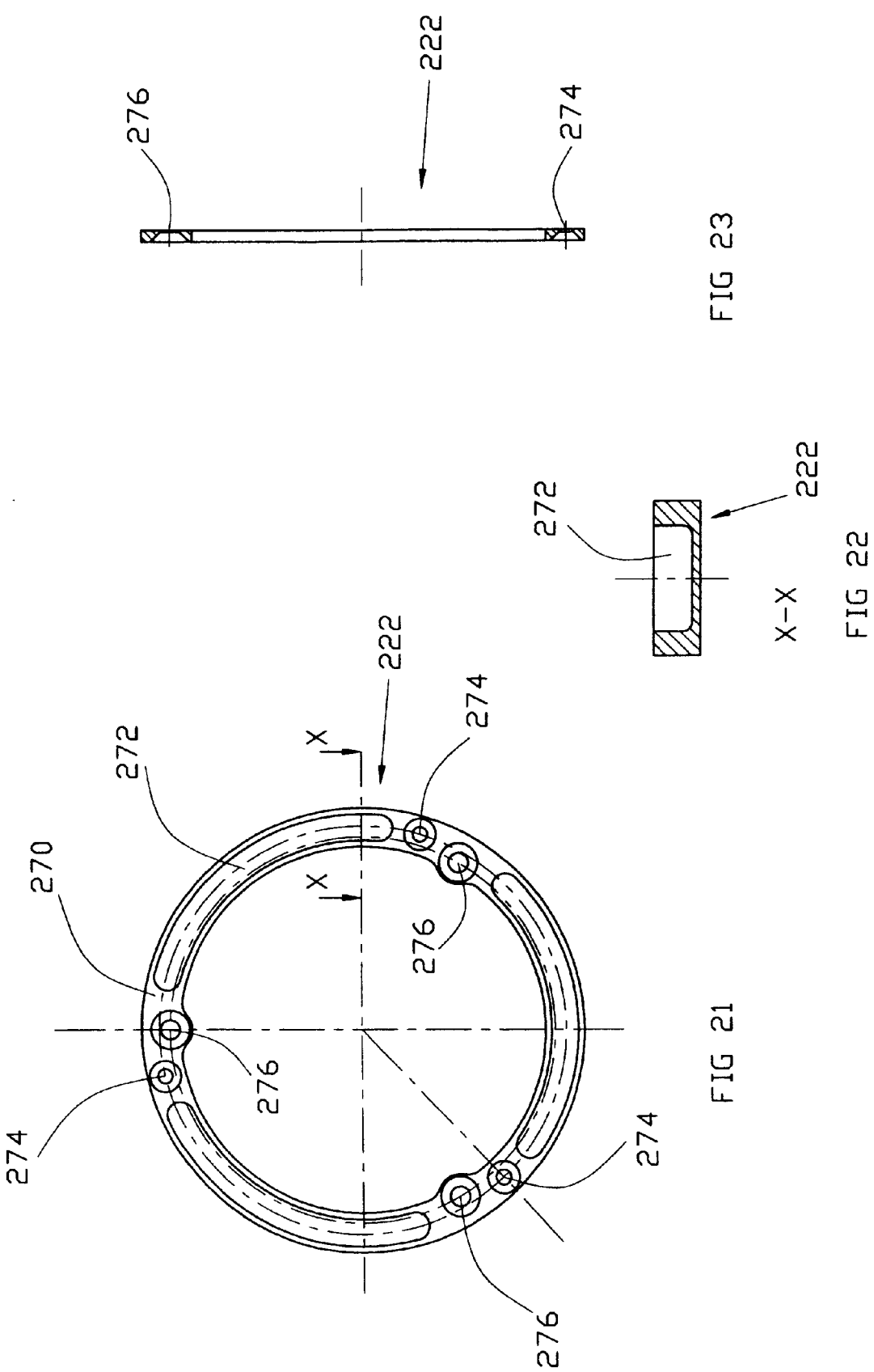

CLUTCH HUB

BACKGROUND AND SUMMARY OF THE INVENTION

The invention relates to clutches and components thereof. In particular, but not exclusively, the invention relates to carbon/carbon clutches especially for high performance vehicles such as racing cars.

It is known to provide carbon/carbon clutches comprising a series of inner and outer plates or discs consisting of carbon/carbon. Such clutch plates are particularly beneficial in providing a lightweight clutch and an increasing coefficient of friction with temperature. However, carbon is also known to have a low shear modulus and accordingly it is important to take great care in transferring drive to the series of driving plates (either of the inner or outer clutch plates) in order to mitigate against failure at the interface between the drive shaft (or other driving means) and the driving plates. Furthermore, it is important to ensure even wear across the different interfaces between the series of outer and the series of inner clutch plates in order to optimise the use of the clutch.

Accordingly, the invention seeks to address these issues and to provide an improved clutch thereby avoiding or at least mitigating these and other problems in the prior art.

Accordingly, a first aspect of the invention provides a hub assembly for a carbon/carbon clutch comprising a hub, a first clutch plate, and retaining means or locator releasably attachable to the first clutch plate thereby axially to fix the first clutch plate with respect to the hub. Preferably the retaining means or locator is readily and/or mechanically releasably attachable to the first clutch plate and preferably still the assembly comprises a threaded bolt or rivet to releasably attach the retaining means to the first clutch plate.

Preferably the retaining means is releasably attachable to the hub, and more preferably is mechanically releasably attachable to the hub. Preferably still the assembly comprises a threaded bolt to releasably attach the retaining means to the hub.

Preferably the hub comprises two or more, and more preferably three or five, circumferentially spaced apart groups of teeth which teeth radially protrude from the hub. Preferably each group comprises two or more teeth, and more preferably 4 or 8 teeth.

In some embodiments of the invention the spacing between an adjacent group of teeth is substantially the size of an individual tooth.

Preferably the spacing between an adjacent group of teeth is adapted to receive an axial protrusion on the first clutch plate.

Preferably the retaining means comprises a retaining ring having an annular body and more preferably also comprises one or more apertures adapted to co-operate with locking means thereby to attach the retaining means to the first clutch plate. Preferably still the retaining ring comprises a series of circumferentially evenly spaced apertures and/or the first clutch plate comprises a series of spaced means to enable releasable attachment to the retaining ring. Preferably the first clutch plate comprises a series of circumferentially evenly spaced apertures adapted to register with a series of apertures in the retaining ring thereby to enable attachment of the first clutch plate and retaining ring for example by riveting. More preferably the assembly comprises a separate sleeve for each of the apertures in the first clutch plate.

Alternatively or additionally the retaining means comprises one or more tabs and preferably each tab comprises one and preferably two apertures.

Preferably the first clutch plate, and preferably still two or more clutch plates, comprise(s) a series of circumferentially spaced groups of recesses adapted to engage teeth on the hub. More preferably an aperture is provided in a spacing in the first clutch plate between an adjacent pair of groups of recesses.

A carbon/carbon clutch can be provided comprising a hub assembly according to the first aspect of the invention.

According to a second aspect of the invention there is provided a hub for a carbon/carbon clutch comprising a splined central aperture and a series of circumferentially spaced and radially protruding teeth, wherein the teeth are clustered in two or more, and preferably three or five, spaced apart groups. Preferably each group comprises two or more teeth and more preferably 4 or 8 teeth.

Preferably the teeth are substantially parallel sided.

Preferably one tooth in each group is wider than the other teeth in the group and preferably one tooth in each group comprises a threaded bore. More preferably the same tooth in each group is wider and has a threaded bore.

Preferably the first clutch plate and hub comprise co-operating drive elements and wherein the assembly is configured such that the retaining means or locator does not pass any rotational drive between the first clutch plate and hub in use.

Preferably the invention comprises a drive prevention mechanism or means which enables relative circumferential movement of the retaining means with respect to at least one of the first clutch plates and the hub. More preferably the drive prevention means comprises a fixing element, which preferably comprises a sleeved rivet, which cooperates with the retaining means and first clutch plate, and is retained in an aperture in one of the retaining means and first clutch plate which aperture is significantly larger than the fixing element to enable circumferential movement between the first clutch plate relative to the retaining means.

According to another aspect of the invention there is provided a clutch plate for a carbon/carbon clutch comprising a central aperture for receiving a toothed hub, and a series of recesses each recess being adapted to co-operate with a hub tooth thereby to enable the clutch plate to be driven, wherein the recesses are clustered into two or more spaced apart groups.

Preferably the clutch plate comprises a series of evenly spaced means to enable releasable attachment of a retaining ring to the first clutch plate.

Preferably the clutch plate comprises a series of circumferentially evenly spaced apertures adapted to register with a series of apertures in the retaining ring thereby to enable attachment of the first clutch and retaining ring for example by riveting and more preferably there is provided a separate sleeve for each of the apertures in the clutch plate.

According to yet another aspect of the invention there is provided a hub assembly for a carbon/carbon clutch comprising a clutch plate and hub adapted to drive the clutch plate rotationally about a central longitudinal axis thereof, and means for axially locating the clutch plate on the hub which axial location means is independent and/or separable from the hub.

Preferably the hub contacts two or more clutch plates.

BRIEF DESCRIPTION OF THE DRAWINGS

Embodiments of the invention will now be described, by way of example only, with reference to the accompanying drawings in which:

FIGS. 1, 2 and 3 are front, sectional side, and end elevation views of a first embodiment of a clutch according to the invention;

FIGS. 9 and 10 are front and sectional side elevation views of a retaining ring forming part of the clutch shown in FIGS. 1 to 4;

FIGS. 19 and 20 are front and sectional side elevation views of a first clutch plate forming part of the third embodiment of a clutch:

FIGS. 21, 22 and 23 are front, a partial sectional side elevation and complete sectional side elevation views of a retaining ring forming part of the third embodiment of a clutch.

DETAILED DESCRIPTION

Figure 4:
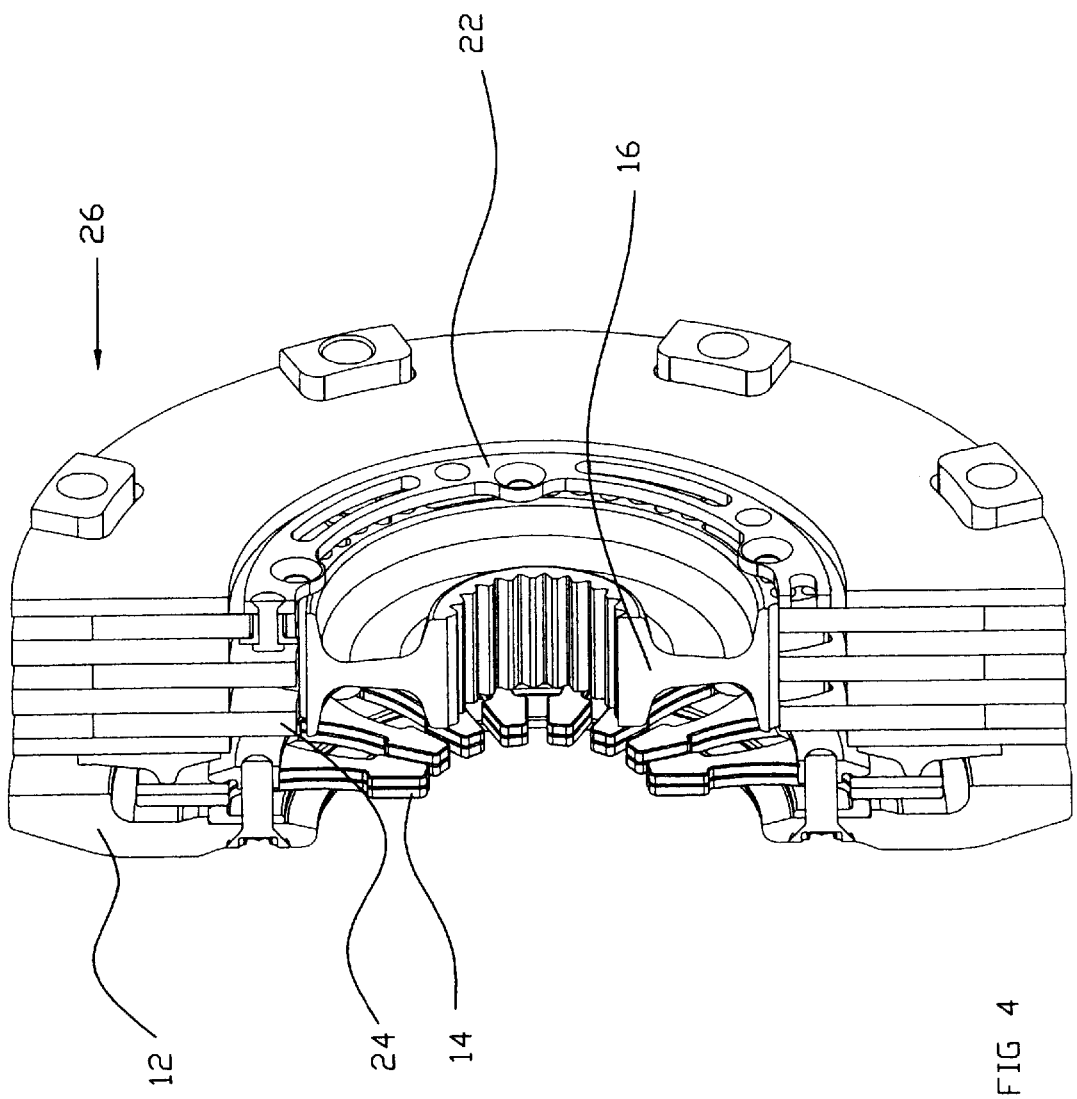
FIG. 4 is an isometric view of part of the clutch shown in FIGS. 1, 2 and 3.

Referring to FIGS. 1 to 4, there is shown a clutch 10 according to the invention, comprising a cover plate 12, a spring 14, a hub 16 and back plate 18. A series of eight equally spaced bores 20 is provided through the cover plate 12 and back plate 18. The bores are circumferentially spaced about the clutch with respect to the central rotational axis A thereof. The bores 20 are adapted to receive a nut and bolt or similar assembly for releasably attaching the cover plate 12 and back plate 18 together. Referring in particular to FIGS. 2 and 4, it can be seen that hub 16 carries a series, in this case 4, inner clutch plates 24 which engage a series, in this case 5, outer clutch plates 26.

Figure 6:
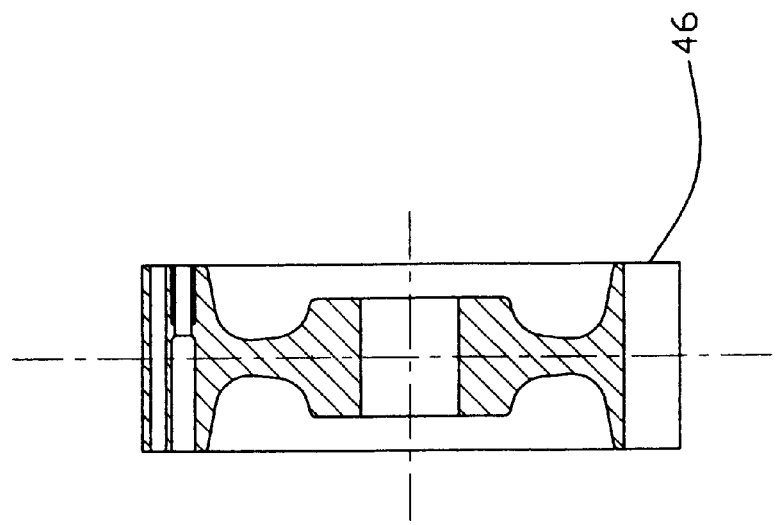
FIGS. 5 and 6 are a front and sectional side elevation view of the hub forming part of the clutch shown in FIGS. 1 to 4.
Figure 5:
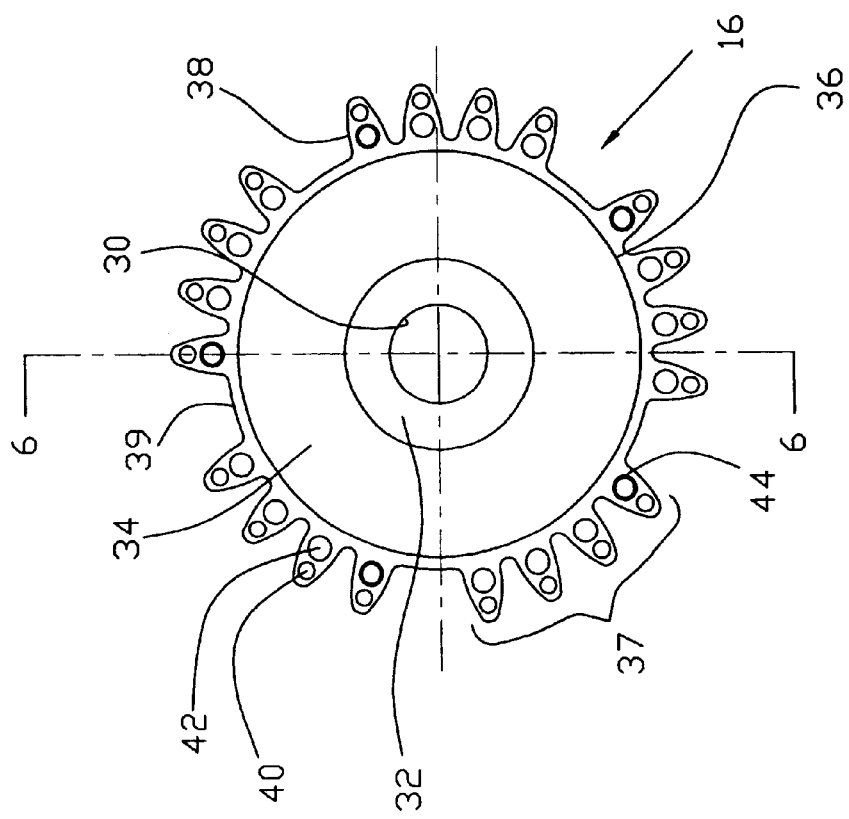

Referring to FIGS. 5 and 6, the hub 16 will now be described in greater detail. The hub 16 comprises a central splined aperture 30 adapted to receive a drive shaft. The central aperture 30 is defined by an inner annulus 32 from which the radial body 34 of the hub extends to an outer annulus 36. The outer annulus 36 carries a series of radically protruding teeth which protrude from the circumferentially outermost edge of the annulus 36. In this case a series of five groups 37 of four teeth 38 are provided. The groups 37 of teeth are separated from one another by spacing 39.

Each of the teeth 38 comprises one or more hollow regions in order to reduce the weight of the teeth. Here, an outer bore 40 and inner bore 42 are provided in each of the teeth 38. Preferably one of the bores is adapted to co-operate with locking means such as a threaded bolt thereby to enable attachment of the retaining ring 22 to the hub 16. In this example, an inner bore 44 of the first tooth of each of the groups 37 of teeth, going in a clock wise direction as described in FIG. 5, is tapped to provide a threaded bore, hereby providing five locations for attaching a retaining ring 22.

Figure 7:
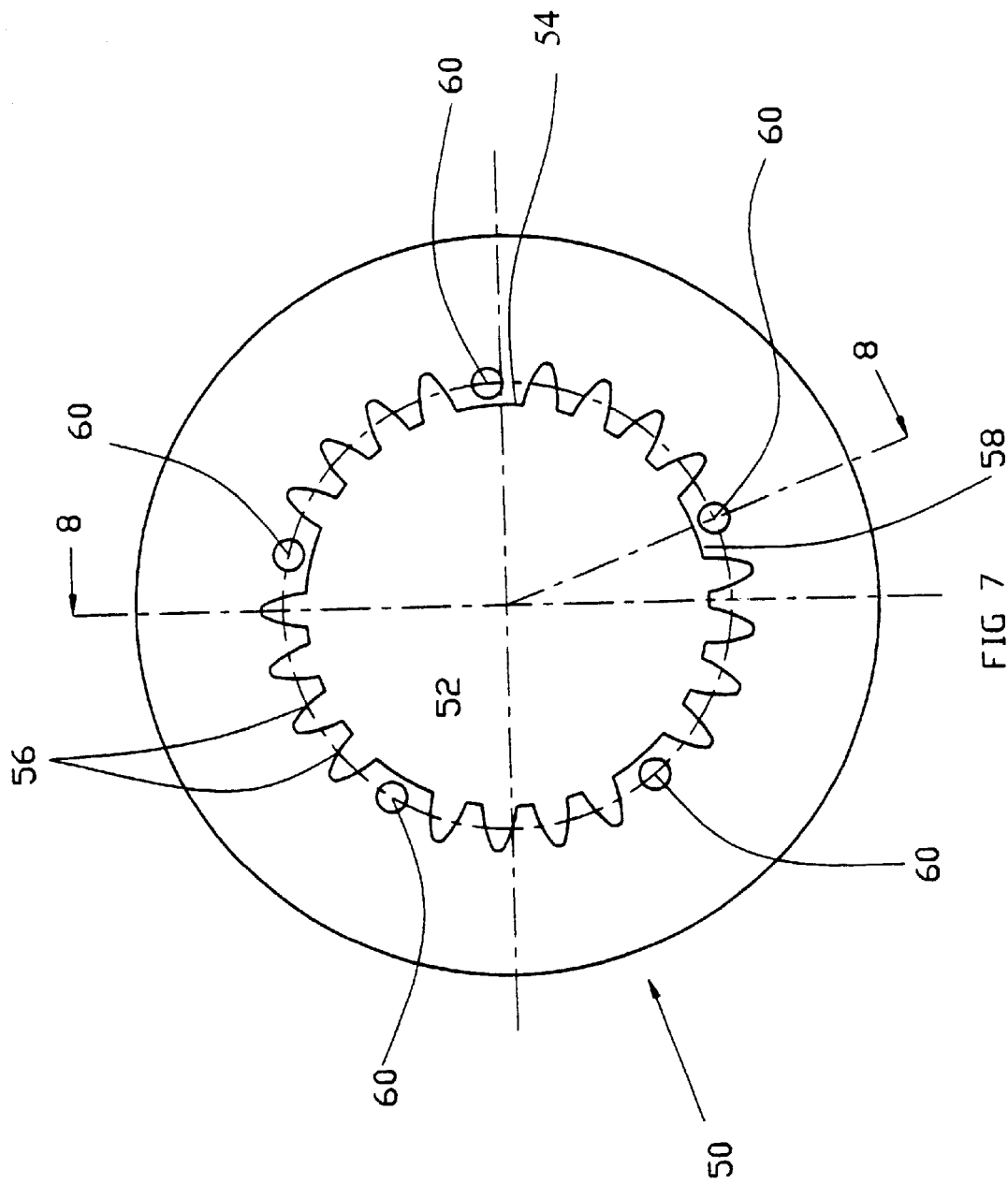
FIGS. 7 and 8 are front and sectional side elevation views of a first clutch plate forming part of the clutch shown in FIGS. 1 to 4.
Figure 8:
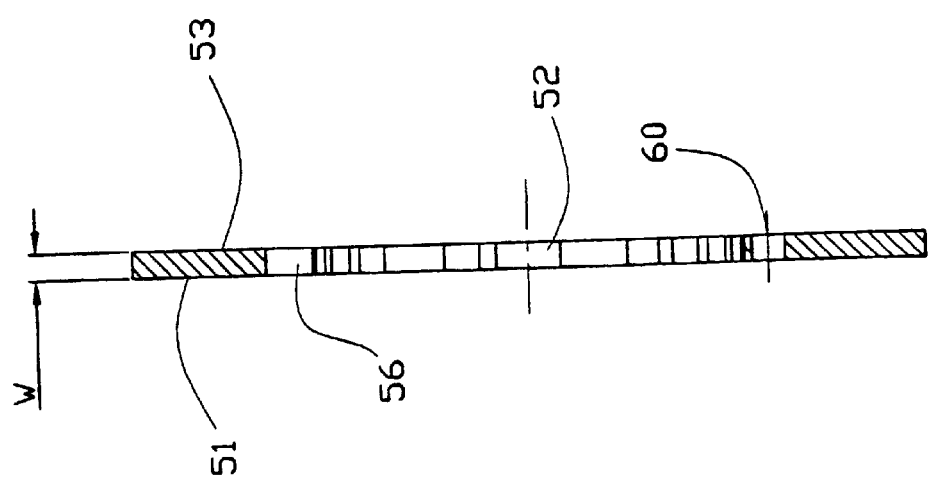

Referring to FIGS. 7 and 8, a first clutch plate 50 is shown which is the right-hand-most clutch plate as viewed in the clutch in FIG. 2. Accordingly, first clutch plate 50 is the first in the series 24 of inner clutch plates and therefore abuts retraining ring 22. The first clutch plate 50 comprises a central aperture 52 to enable the plate to be passed over the hub 16. The central aperture 52 is defined by an inner rim 54 which comprises a series of five groups of four recesses 56 adapted to engage the teeth 38 of the hub 16. Each of the groups of recesses are separated by a spacing or land 58, each containing an aperture 60. Accordingly, five apertures 60 are provided, one in each of lands 58 as can be seen in FIG. 7. Apertures 60 enable attachment of the plate 50 to retaining ring 22. As can be seen from FIGS. 7 and 8, clutch plate 50 is a substantially annular form having a relatively narrow width compared to its diameter. The plate 50 comprises a first surface 51 and a second surface 53. Further inner clutch plates in the series 24 are provided but these do not require apertures 60. Accordingly, the inner clutch plates can be described as comprising what would be 25 equally spaced inner recesses for receiving teeth from the hub, wherein each plate has five equal spaced missing recesses thereby providing spacings 58 between five groups of four recesses.

Referring to FIGS. 9 and 10, the retaining ring 22 or locator is shown in greater detail as comprising an annular body 70 comprising a series of five evenly spaced slots 72 which help reduce the weight of the ring. Between each pair of slots 72 is an aperture 74 for co-operating with locking means to attach the retaining ring to a first clutch plate 50. Additionally, there is also provided an aperture 76 between each slot 72, which aperture 76 co-operates with locking means to enable attachment of the retaining ring 22 to hub 16. Preferably apertures 74 and 76 are countersunk.

Figure 12:
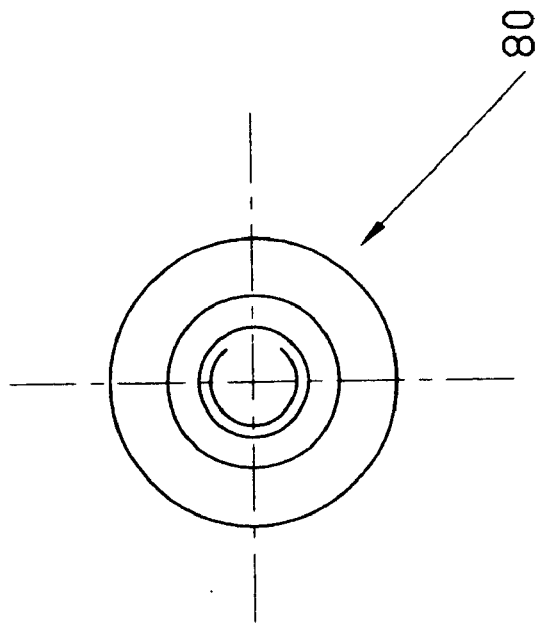
FIGS. 11 and 12 are a sectional side elevation and front elevation view of a sleeve forming part of the clutch shown in FIGS. 1 to 4.
Figure 11:
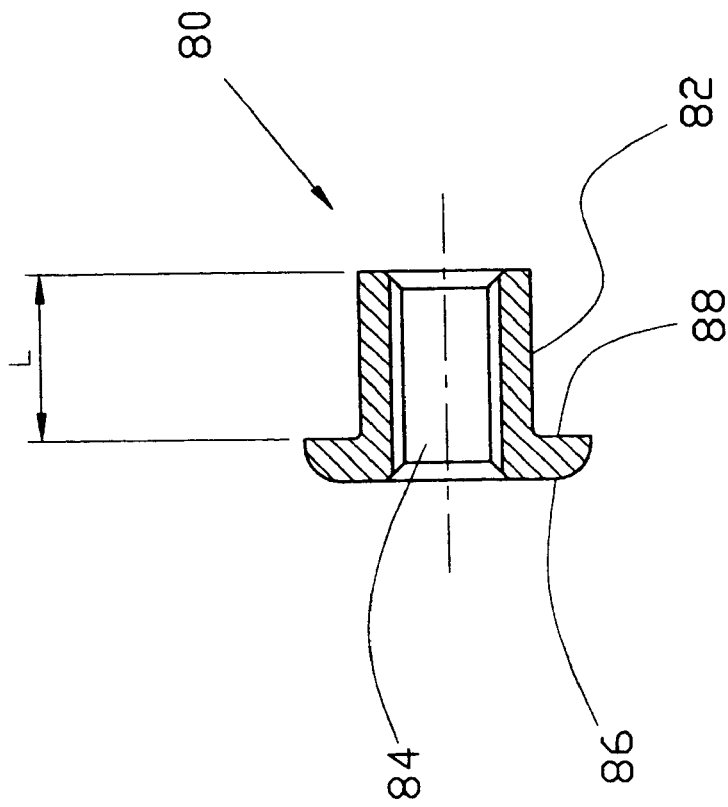

Referring to FIGS. 11 and 12, there is shown a sleeve 80 which is used as a spacer in each of the apertures 60 in the first clutch plate 60. Each sleeve 80 comprises a shank or body 82 having a through bore 84 and an end annulus 86 which provides an annular face or shoulder 88 which operably abuts against one face 51 of the first clutch plate 50. Preferably, the length L of the shank 82 is slightly greater than the width W of the first clutch plate 50, and the diameter of the shank 82 is less than the diameter of aperture 60. For example, the length L might be about 50 microns greater than width W, and the diameter of shank 82 might be in the order of between 0.5 and 3 mm less than the inside diameter of aperture 60. The difference in diameter allows for carbon wear in the drive recess of the first carbon/carbon clutch plate 50. Preferably the shoulder 88 extends beyond the outer diameter of shank 32 by 3 mm or more.

Figure 14:
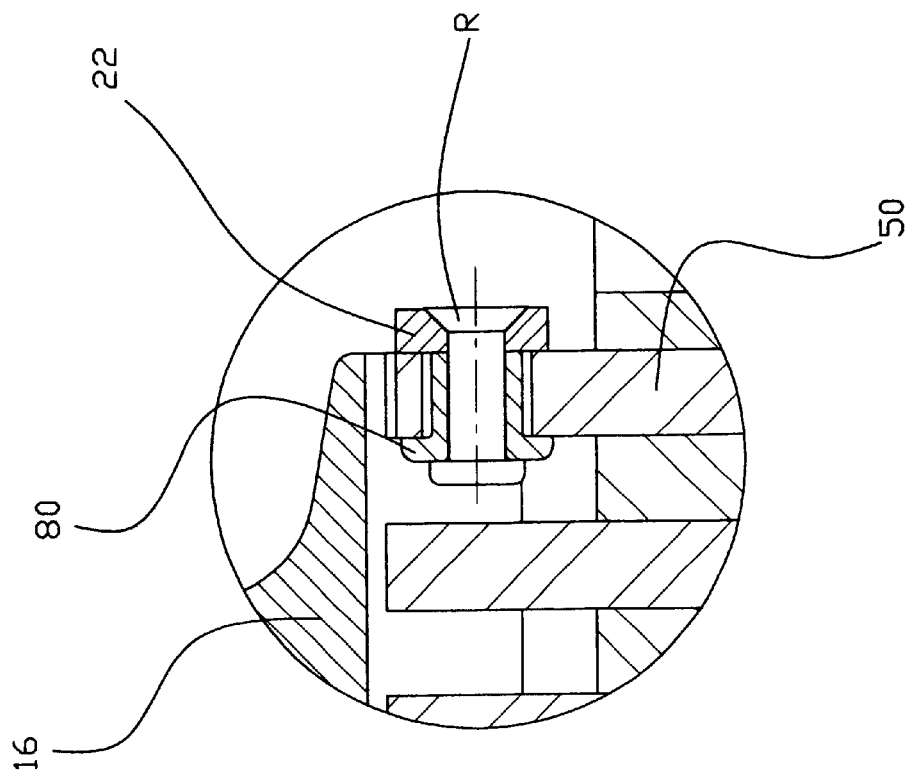
FIG. 14 is an enlarged view of part of the assembled clutch shown in FIGS. 1 to 5 comprising a sleeve and first clutch plate.
Figure 3:
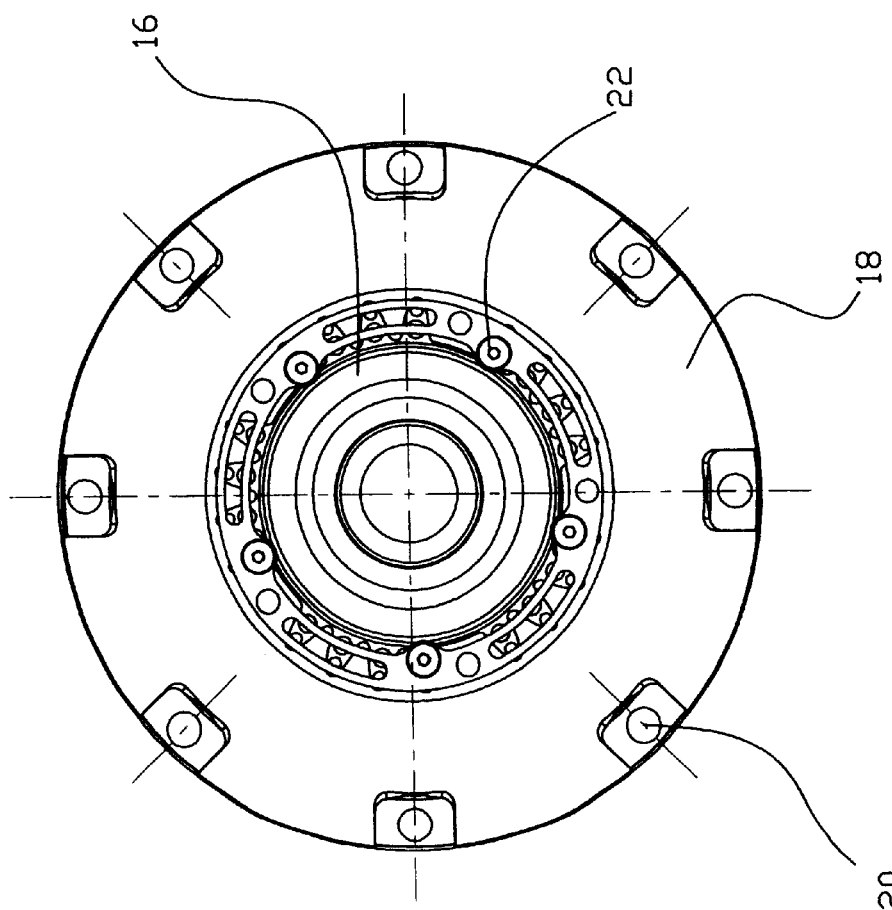

The relative positions of sleeve 80, first clutch plate 50 and retaining ring 22 in use can be seen from FIG. 14, wherein a rivet R is shown holding the components together.

Clutch 10 is assembled by inserting a sleeve 80 in each of apertures 60 in the first clutch plate 50 such that the shoulder 88 abuts the first surface 51. The second surface 53 of clutch plate 50 is then brought into contact with the retaining ring 22 and attached thereto. In this embodiment, rivets are used to pass through each of the apertures 74 in the retaining ring 22 and each of the apertures 60 in the first clutch plate, and therefore the rivets pass through sleeves 80 also. After riveting, the head and penned end of the rivet provide a load or holding force to fix sleeve 80 against retaining ring 22 thereby to fix the axial position of first clutch plate 50 with respect to the retaining ring 22. It should be noted however that some degree of circumferential movement is provided due to the difference in diameter of shank 82 of sleeve 80 compared with the diameter of apex 60 in retaining ring 22.

Figure 13:
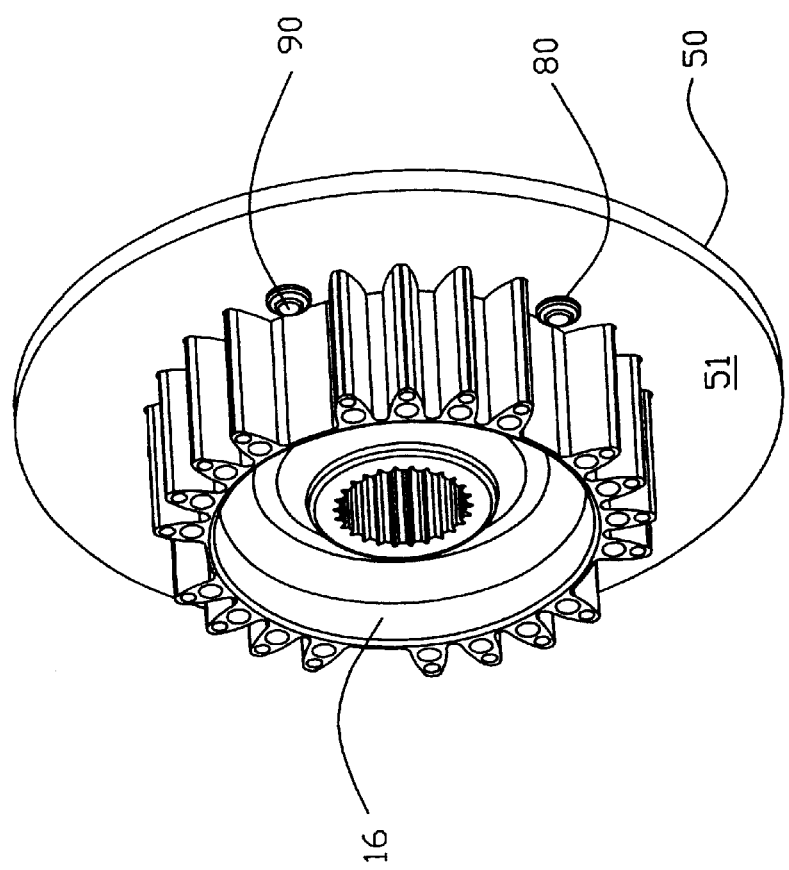
FIG. 13 is an isometric view of the hub and first clutch plate according to the first embodiment of the invention.

The first clutch plate and retaining ring sub-assembly, as shown in FIG. 13, is then attached to hub 16 using co-operating locking elements or means which in this embodiment comprises a series of five countersunk screws which are passed through apertures 76 in the retaining ring 22 and threaded apertures 44 of hub 16.

Thereafter, the axial position of each of the inner and outer clutch plates is defined by the first clutch plate 50.

The clutch plate is assembled by mounting the hub and clutch plate sub-assembly against backing plate 18 and attaching front cover plate 12 and spring 14 as appropriate.

Beneficially the provision of the first clutch plate being accurately axially located with respect to the hub greatly reduces any hub float and because of this the hub can itself be narrow (i.e. axially narrow with respects to rotational axis A), and is therefore lighter and more compact with reduced moment of inertia and benefits arise in the overall clutch itself also. Also, sleeve 80 acts to allow slight variation in the separation of the first clutch plate 50 circumferentially with respect to the retaining ring 22, since shank 82 has a diameter less than the diameter of aperture 60, thereby to ensure that drive from hub 16 is transferred to first clutch plate 50 via teeth 38 and co-operating recesses 56. For example said 1 mm of circumferential play can be allowed. According the sleeve 80 does not carry any clutch load in use.

Figure 15:
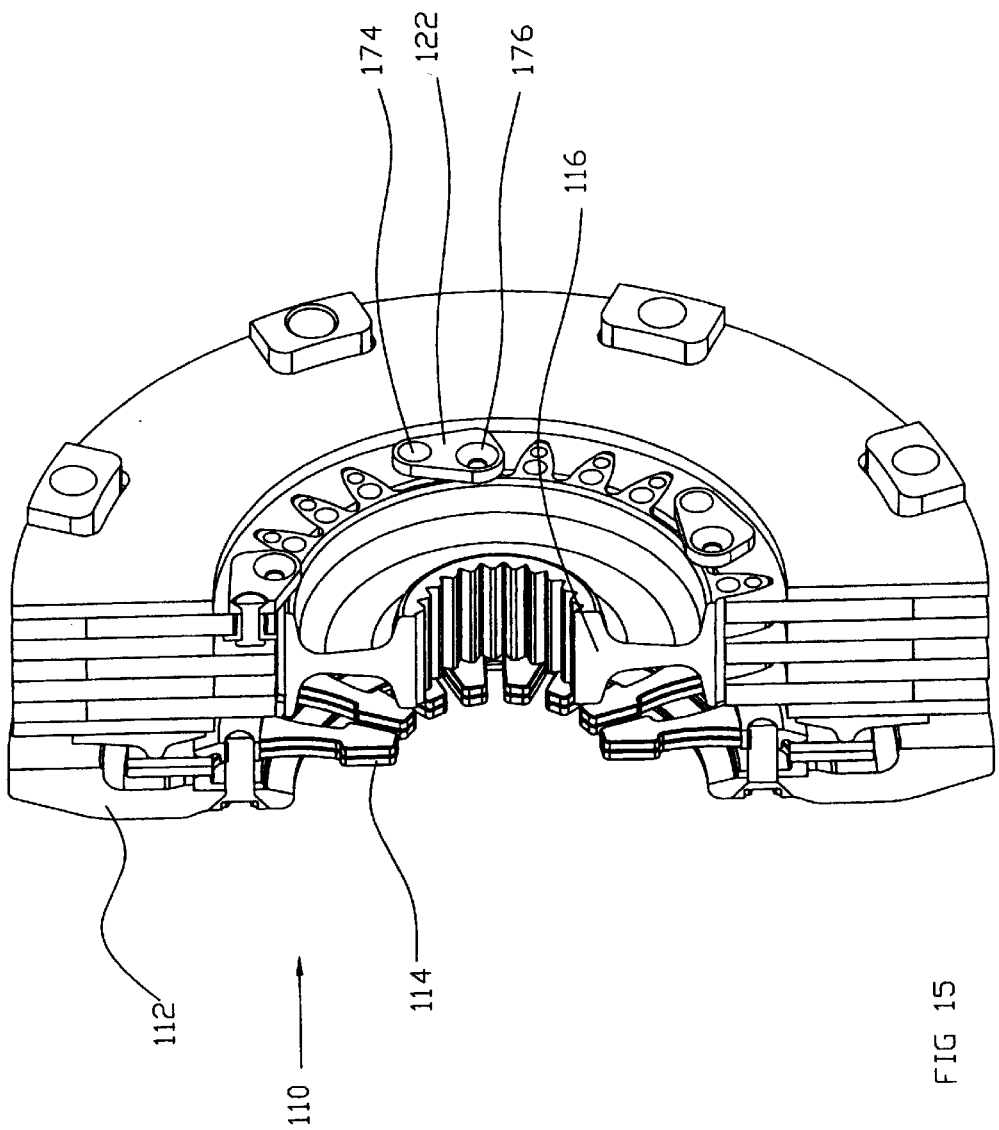
FIGS. 15 and 16 are an isometric view of part and all (respectively) of a clutch according to a second embodiment of the invention.
Figure 16:
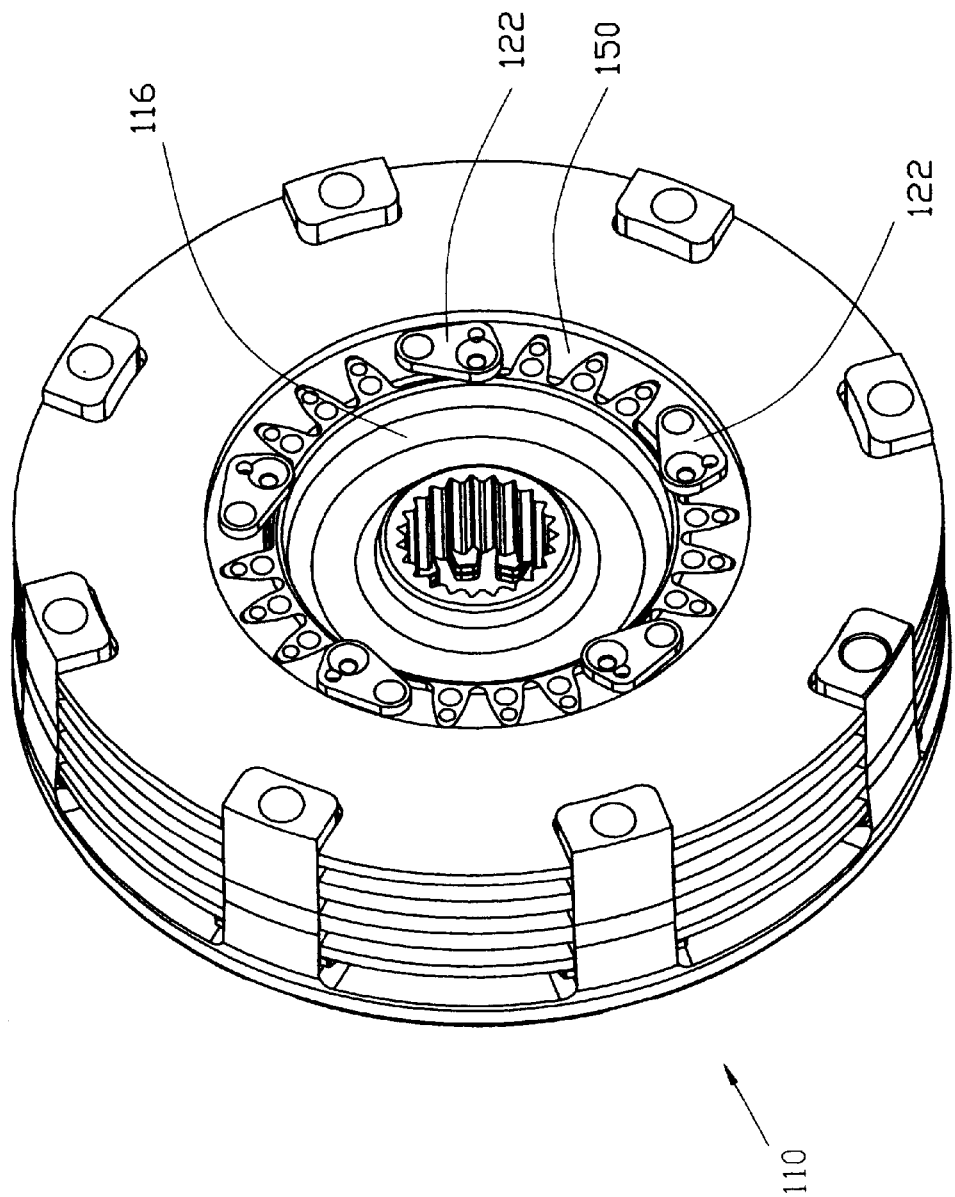

A second embodiment of a clutch according to the invention is shown in FIGS. 15 and 16. Clutch 110 comprises similar components to those of clutch 10 shown in FIGS. 1 to 13 and accordingly the same two digit reference numerals are used prefixed by the numeral 1 for such like components. Accordingly, clutch 110 comprises a front cover plate 112, a spring 114 and a hub 116. The arrangement of inner and outer clutch plates is the same as in the first embodiment of clutch 10, however, there is a difference in the second embodiment in the form of the retaining means for axially locating the first clutch plate 150 with respect to hub 116. Accordingly, in this embodiment, a series of five retaining tabs 122 is provided wherein each tab 122 comprises an aperture 174 for co-operating with locking means to attach the tab to the first clutch plate 150 and a second aperture 176 for attaching the tab 122 to the hub 116. As can be seen in FIGS. 15 and 16 preferably aperture 176 is counter sunk to receive a counter sunk screw which fastens into tapped aperture 144 in hub 116.

A third embodiment of a clutch according to the invention is shown in FIGS. 17 to 25. The third embodiment of the clutch comprises similar components to those of clutch 10 shown in FIGS. 1 to 13 and accordingly the same two digit references numerals are used prefixed by the numeral 2 for such like components.

Figure 18:
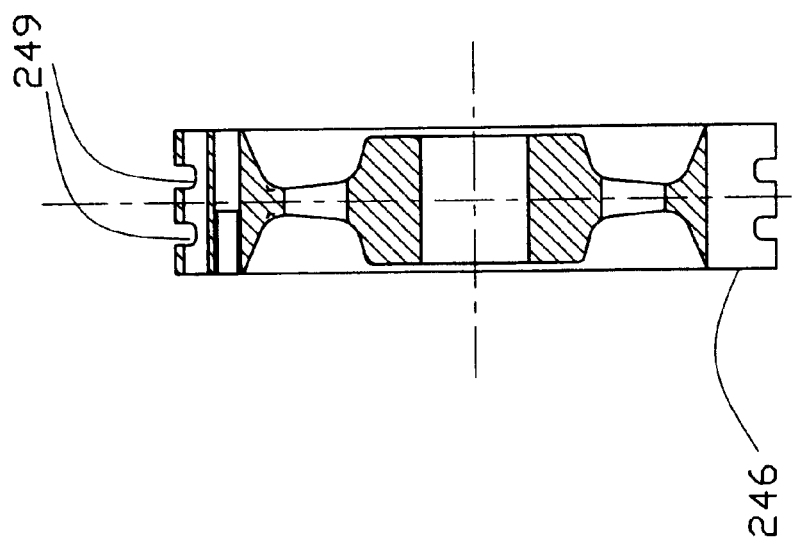
FIGS. 17 and 18 are a front and sectional side elevation view of a hub forming part of a third embodiment of a clutch according to the invention.
Figure 17:
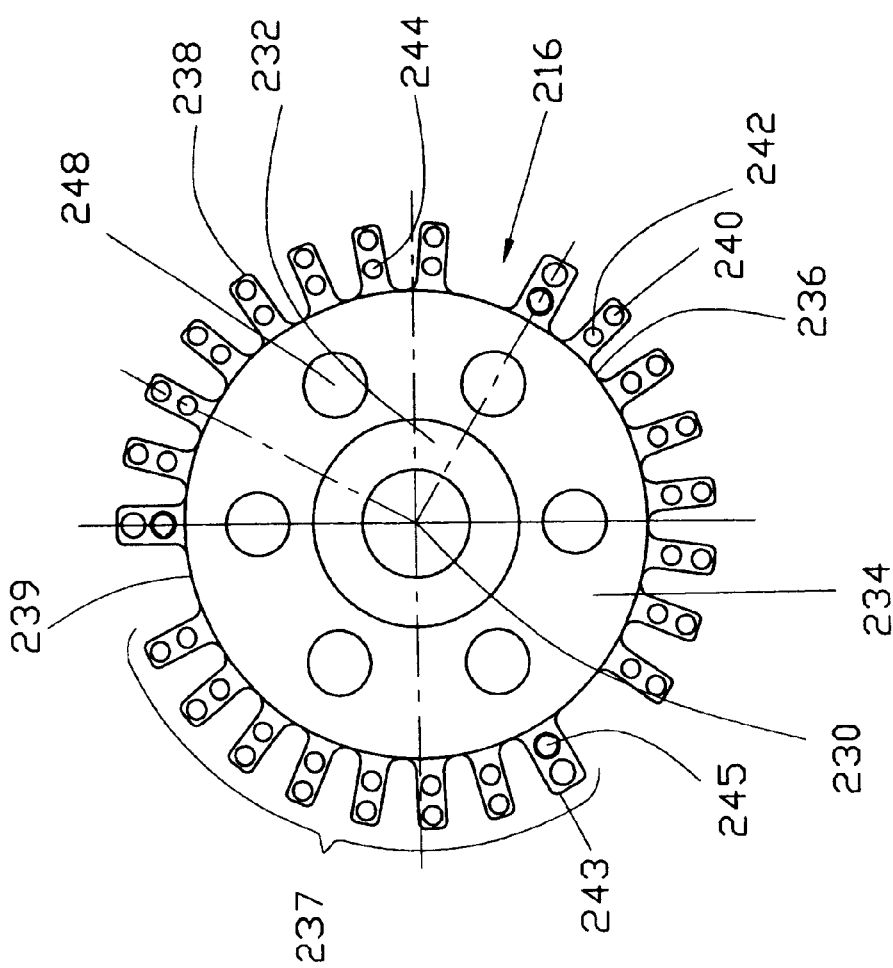

Referring to FIGS. 17 and 18, the hub 216 will now be described in detail. Accordingly, the hub 216 comprises a central aperture 230 adapted to receive a drive shaft. The arrangement of inner 232 and outer 236 annuli is the same as in the first embodiment of the hub, however, there is a difference in the third embodiment in the form of the series of radially protruding teeth which protrude from the circumferentially outermost edge of the annulus 236. In this case the teeth are substantially parallel sided and comprise a series of three groups 237 of eight teeth 238 are provided. The groups 237 of teeth are separated from one another by spacing 239. The increased number of teeth of this embodiment and the parallel sided nature of the teeth provide an increased surface area for contact with the inner clutch plates such as the first clutch plate 250.

Each of the teeth 238 comprises an outer bore 240 and inner bore 242 as with the first embodiment of clutch 16. In this example, an inner bore 245 of the first tooth 243 of each of the groups 237 of teeth, going in a clock wise direction as described in FIG. 17, is tapped to provide a threaded bore, thereby providing three locations for attaching a retaining ring 222. Each first tooth 243 is slightly wider than the other teeth 238, preferably by about 1.5 mm, to accommodate a larger inner bore 245 which is more suitable as a location for attachment.

In order to reduce the weight of the hub 216 there are provided bores 248 in the radial body 234 and grooves 249 in the teeth 238.

Referring to FIGS. 19 and 20, a first clutch plate 250 is shown. Accordingly, first clutch plate 250 is the first in the series of inner clutch plates and therefore abuts retaining ring 222. The first clutch plate 250 is substantially similar to the first embodiment 50 except that the inner rim 254 comprises a series of three groups of eight recesses 256 adapted to engage the teeth 238 of the hub 216 and the three first recesses 257 are wider to engage the first teeth 243. Also apertures 260 are elongate in shape enabling more circumferential freedom between the first plate 250 and retaining ring 222

Referring to FIGS. 21, 22 and 23 where FIG. 22 is a section through the line XX on FIG. 21, the third embodiment of retaining ring 222 or locator is shown. The retaining ring 222 is substantially similar to the first embodiment 22 except that the annular body 270 comprises a series of three evenly spaced blind slots 272, three apertures 274 adapted to co-operate with locking means to attach the retaining ring 222 to the first clutch plate 250, and three apertures 276 to enable attachment of the retaining ring 222 to hub 216.

Figure 25:
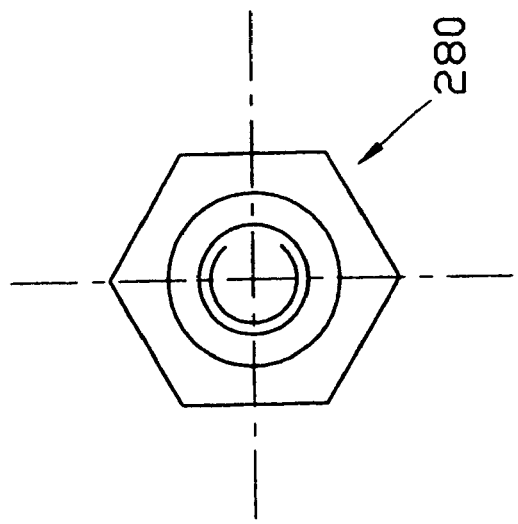
FIGS. 24 and 25 are a sectional side elevation and front elevation view of a sleeve forming part of the third embodiment of a clutch.
Figure 24:
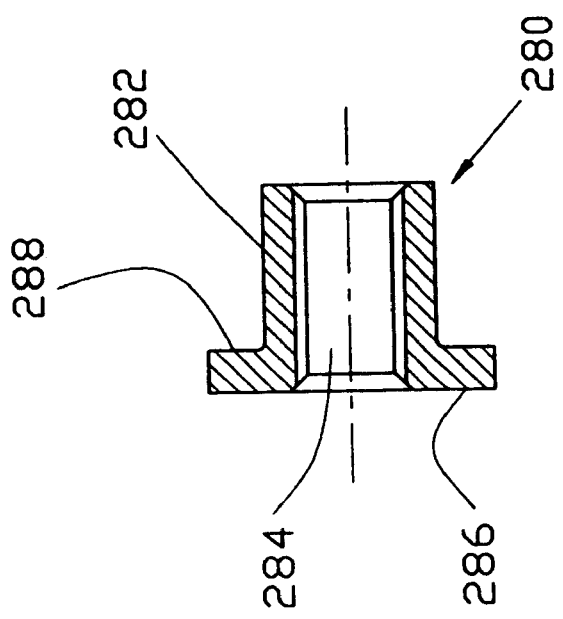

Referring to FIGS. 24 and 25, there is shown a sleeve 280 which is used as a spacer in each of the apertures 260 in the first clutch plate 250. Each sleeve 280 is substantially similar to the first embodiment 80 except for a different shaped end annulus 286, being hexagonal rather than circular enabling gripping by a tool for example.

Accordingly first plate 250 is attached via sleeves 280 and aperture 260 to the retaining ring 222 by a mechanical attachment such as a rivet which passes through aperture 274. Retaining ring 222 is subsequently attachable to hub 216 using mechanical attachments such as threaded bolts which passes through apertures 276 in retaining ring 222 into threaded apertures 244 in hub 216.

What is claimed is:

1. A hub assembly for a carbon/carbon clutch comprising a hub, a first clutch plate, and retaining means mechanically releasably attachable to the first clutch plate thereby axially to define the position of the first clutch plate with respect to the hub wherein the first clutch plate is directly attachable to the hub.

2. An assembly according to claim 1 wherein the hub radially overlaps the first clutch plate.

3. An assembly according to claim 1 comprising a threaded bolt or rivet to releasably attach the retaining means to the first clutch plate.

4. An assembly according to claim 1 wherein the retaining means is releasably attachable to the hub.

5. An assembly according to claim 4 wherein the retaining means is mechanically releasably attachable to the hub.

6. An assembly according to claim 5 comprising a threaded bolt to releasably attach the retaining means to the hub.

7. An assembly according to claim 1 wherein the hub comprises two or more circumferentially spaced apart groups of teeth which teeth radially protrude from the hub.

8. An assembly according to claim 7 comprising one of three and five groups of teeth.

9. An assembly according to claim 7 wherein each group comprises two or more teeth.

10. An assembly according to claim 9 wherein each group comprises one of 4 and 8 teeth.

11. An assembly according to claim 7 wherein the spacing between an adjacent group of teeth is substantially the size of an individual tooth.

12. An assembly according to claim 7 where the teeth are substantially parallel sided.

13. An assembly according to claim 7 where one tooth in each group is wider than the other teeth in the group.

14. An assembly according to claim 7 where one tooth in each group comprises a threaded bore.

15. An assembly according to claim 14 where the tooth in each group that comprises a threaded bore is wider than the other teeth in the group.

16. An assembly according to claim 7 wherein the spacing between an adjacent group of teeth is adapted to receive an axial protrusion on the first clutch plate.

17. An assembly according to claim 1 wherein an integral part of the hub contacts two or more clutch plates in use.

18. An assembly according to claim 1 adapted to drive the clutch plate rotationally about a central longitudinal axis thereof, wherein the retaining means is independent and/or separable from the hub.

19. An assembly according to claim 1 wherein the retaining means comprises a retaining ring having an annular body.

20. An assembly according to claim 19 wherein the retaining ring comprises one or more apertures adapted to co-operate with locking means thereby to attach the retaining means to the first clutch plate.

21. An assembly according to claim 20 wherein the retaining ring comprises a series of circumferentially spaced apertures.

22. An assembly according to claim 20 wherein the first clutch plate comprises a series of spaced means to enable releasable attachment to the retaining means.

23. An assembly according to claim 22 wherein the clutch plate comprises a series of circumferentially spaced apertures adapted to register with a series of apertures in the retaining ring thereby to enable attachment of the first clutch plate and retaining ring.

24. An assembly according to claim 23 comprising a separate sleeve for each of the apertures in the first clutch plate.

25. An assembly according to claim 1 wherein the retaining means comprises one or more tabs.

26. An assembly according to claim 25 wherein each tab comprises an aperture.

27. An assembly according to claim 1 wherein the first clutch plate comprises a series of circumferentially spaced groups of recesses adapted to engage teeth on the hub.

28. An assembly according to claim 27 comprising two or more clutch plates which comprise a series of circumferentially spaced groups of recesses adapted to engage teeth on the hub.

29. An assembly according to claim 27 wherein an aperture is provided in a spacing in the first clutch plate between an adjacent pair of groups of recesses.

30. An assembly according to claim 1 wherein the first clutch plate and hub comprise co-operating drive elements and wherein the assembly is configured such that the retaining means does not pass any rotational drive between the first clutch plate and hub in use.

31. An assembly according to claim 30 comprising a drive prevention mechanism or means which enables relative circumferential movement of the retaining means with respect to at least one of the first clutch plates and the hub.

32. As assembly according to claim 31 wherein drive prevention means comprises a fixing element which co-operates with the retaining means and the first clutch plate, and is retained in an aperture in one of the retaining means and the first clutch plate which aperture is significantly larger than the fixing element to enable circumferential movement between the first clutch plate relative to the retaining means.

33. An assembly according to claim 32 wherein the fixing element comprises a sleeved rivet.

34. A carbon/carbon clutch comprising an assembly according to claim 1.

35. An assembly according to claim 20 wherein the retaining ring comprises a series of circumferentially substantially evenly spaced apertures.

36. An assembly according to claim 23 wherein the enabled attachment of the first clutch plate and retaining ring is by riveting.

37. An assembly according to claim 25 wherein each tab comprises two apertures.

38. A hub for a carbon/carbon clutch comprising a splined central aperture and a series of circumferentially spaced and radially protruding teeth, wherein the teeth are clustered in two or more spaced apart groups, and wherein one tooth in each group comprises a threaded bore.

39. A hub according to claim 38 comprising five groups of teeth.

40. A hub according to claim 38 wherein each group comprises two or more teeth.

41. A hub according to claim 40 wherein each group comprises 4 teeth.

42. A hub according to claim 38 comprising three groups of teeth.

43. A hub according to claim 42 wherein each group comprises 8 teeth.

44. A hub according to claim 38 where the teeth are substantially parallel sided.

45. A hub according to claim 38 where one tooth in each group is wider than the other teeth in the group.

46. A hub according to claim 38 where one tooth in each group comprises a threaded bore, and which is wider than the other teeth in the group.

47. A hub according to claim 38 wherein the spacing between an adjacent group of teeth is substantially the size of an individual tooth.

48. A clutch plate for a carbon/carbon clutch comprising a central aperture for receiving a toothed hub, and a series of recesses each recess being adapted to co-operate with a hub tooth thereby to enable the clutch plate to be driven, wherein the recesses are clustered into two or more spaced apart groups, and wherein the clutch plate comprises a series of evenly spaced means to enable releasable attachment of a retaining ring to the clutch plate.

49. A clutch plate for a carbon/carbon clutch comprising a central aperture for receiving a toothed hub, and a series of recesses each recess being adapted to co-operate with a hub tooth thereby to enable the clutch plate to be driven, wherein the recesses are clustered into two or more spaced apart groups, wherein the clutch plate comprises a series of circumferentially evenly spaced apertures adapted to register with a series of apertures in a retaining ring thereby to enable attachment of the clutch plate and retaining ring.

50. A clutch plate according to claim 49 comprising a separate sleeve for each of the apertures in the clutch plate.

51. A clutch plate according to claim 49 wherein the enabled attachment of the clutch plate and retaining ring is by riveting.

* * * * *